(12) United States Patent
Malecki et al.

(10) Patent No.: US 8,580,342 B2
(45) Date of Patent: Nov. 12, 2013

(54) LOW TEMPERATURE CNT GROWTH USING GAS-PREHEAT METHOD

(75) Inventors: Harry C. Malecki, Abingdon, MD (US); Tushar K. Shah, Columbia, MD (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 321 days.

(21) Appl. No.: 12/714,390

(22) Filed: Feb. 26, 2010

(65) Prior Publication Data

US 2010/0221424 A1 Sep. 2, 2010

Related U.S. Application Data

(60) Provisional application No. 61/155,935, filed on Feb. 27, 2009.

(51) Int. Cl.
*C23C 16/00* (2006.01)
*D01F 9/12* (2006.01)
*D01C 5/00* (2006.01)

(52) U.S. Cl.
USPC .................. 427/249.1; 423/447.1; 423/447.3

(58) Field of Classification Search
USPC .......................... 427/249.1; 423/447.1, 447.3
See application file for complete search history.

(56) References Cited

U.S. PATENT DOCUMENTS

| | | | |
|---|---|---|---|
| 4,300,821 A | 11/1981 | Mignen | |
| 4,515,107 A | 5/1985 | Fournier et al. | |
| 4,530,750 A | 7/1985 | Aisenberg et al. | |
| 4,707,349 A | 11/1987 | Hjersted | |
| 4,797,378 A | 1/1989 | Sowman | |
| 4,920,917 A | 5/1990 | Nakatani et al. | |
| 5,093,155 A | 3/1992 | Miyazaki et al. | |
| 5,130,194 A | 7/1992 | Baker et al. | |
| 5,173,367 A | 12/1992 | Liimatta et al. | |
| 5,221,605 A | 6/1993 | Bard et al. | |
| 5,225,659 A | 7/1993 | Kusano et al. | |
| 5,238,808 A | 8/1993 | Bard et al. | |
| 5,246,794 A | 9/1993 | Blomgren et al. | |
| 5,310,687 A | 5/1994 | Bard et al. | |
| 5,470,408 A | 11/1995 | Nielson et al. | |

(Continued)

FOREIGN PATENT DOCUMENTS

| | | |
|---|---|---|
| CN | 1345694 | 4/2002 |
| CN | 1477260 | 2/2004 |

(Continued)

OTHER PUBLICATIONS

Zhang et al., "Integration and characterization of aligned carbon nanotubes on metal/silicon substrates and effects of water", Applied Surface Science 255 (2009) 5003-5008.

(Continued)

*Primary Examiner* — Kelly M Gambetta
(74) *Attorney, Agent, or Firm* — McDermott Will & Emery LLP

(57) ABSTRACT

A method for synthesizing carbon nanotubes (CNT) comprises the steps of providing a growth chamber, the growth chamber being heated to a first temperature sufficiently high to facilitate a growth of carbon nanotubes; and passing a substrate through the growth chamber; and introducing a feed gas into the growth chamber pre-heated to a second temperature sufficient to dissociate at least some of the feed gas into at least free carbon radicals to thereby initiate formation of carbon nanotubes onto the substrate.

10 Claims, 12 Drawing Sheets

(56) References Cited

U.S. PATENT DOCUMENTS

| | | |
|---|---|---|
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,780,101 A | 7/1998 | Nolan et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,462 A | 11/2000 | Yializis et al. |
| 6,146,642 A | 11/2000 | Garcia-Sastre et al. |
| 6,184,280 B1 | 2/2001 | Shibuta |
| 6,221,154 B1 | 4/2001 | Lee et al. |
| 6,232,706 B1 | 5/2001 | Dai et al. |
| 6,251,520 B1 | 6/2001 | Blizzard et al. |
| 6,270,897 B1 | 8/2001 | Flautt et al. |
| 6,331,209 B1 | 12/2001 | Jang et al. |
| 6,333,016 B1 | 12/2001 | Resasco et al. |
| 6,361,861 B2 | 3/2002 | Gao |
| 6,413,487 B1 | 7/2002 | Resasco et al. |
| 6,420,293 B1 | 7/2002 | Chang et al. |
| 6,440,277 B1 | 8/2002 | D'Amato |
| 6,455,021 B1 | 9/2002 | Saito |
| 6,465,057 B1 | 10/2002 | Nakahigashi et al. |
| 6,479,028 B1 | 11/2002 | Kaner et al. |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Den et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,531 B1 | 1/2007 | Jacques et al. |
| 7,160,532 B2 | 1/2007 | Liu et al. |
| 7,211,320 B1 | 5/2007 | Cooper et al. |
| 7,226,643 B2 | 6/2007 | Juang et al. |
| 7,235,159 B2 | 6/2007 | Gu et al. |
| 7,239,073 B2 | 7/2007 | Takikawa et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,294,302 B2 | 11/2007 | Koide et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Oiry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,656,027 B2 | 2/2010 | Dangelo et al. |
| 7,687,981 B2 | 3/2010 | Parsapour |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 2002/0035170 A1 | 3/2002 | Glatkowski et al. |
| 2002/0085968 A1 | 7/2002 | Smalley et al. |
| 2002/0102201 A1 | 8/2002 | Colbert et al. |
| 2002/0197474 A1 | 12/2002 | Reynolds |
| 2003/0042147 A1 | 3/2003 | Talin et al. |
| 2003/0068432 A1 | 4/2003 | Dai et al. |
| 2003/0102585 A1 | 6/2003 | Poulin et al. |
| 2003/0111333 A1 | 6/2003 | Montgomery et al. |
| 2004/0007955 A1 | 1/2004 | Yaniv et al. |
| 2004/0026234 A1 | 2/2004 | Vandern Brande et al. |
| 2004/0082247 A1 | 4/2004 | Desai et al. |
| 2004/0105807 A1 | 6/2004 | Fan et al. |
| 2004/0245088 A1 | 12/2004 | Gardner |
| 2004/0247808 A1 | 12/2004 | Cooper et al. |
| 2004/0253167 A1 | 12/2004 | Silva et al. |
| 2005/0009694 A1 | 1/2005 | Watts et al. |
| 2005/0026778 A1 | 2/2005 | Axtell et al. |
| 2005/0090176 A1 | 4/2005 | Dean et al. |
| 2005/0093458 A1 | 5/2005 | Babayan et al. |
| 2005/0100501 A1 | 5/2005 | Veedu et al. |
| 2005/0112052 A1 | 5/2005 | Gu et al. |
| 2005/0119105 A1 | 6/2005 | Zimmer et al. |

(56) References Cited

U.S. PATENT DOCUMENTS

| | | |
|---|---|---|
| 2005/0119371 A1 | 6/2005 | Drzal et al. |
| 2005/0164169 A1 | 7/2005 | Malak |
| 2005/0170089 A1 | 8/2005 | Lashmore et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0191490 A1 | 9/2005 | Ton-That et al. |
| 2005/0215164 A1 | 9/2005 | Mueller et al. |
| 2005/0260412 A1 | 11/2005 | Gardner |
| 2005/0263546 A1 | 12/2005 | Cooper et al. |
| 2005/0287064 A1 | 12/2005 | Mayne et al. |
| 2006/0052509 A1 | 3/2006 | Saitoh |
| 2006/0062944 A1 | 3/2006 | Gardner et al. |
| 2006/0067871 A1 | 3/2006 | Hart et al. |
| 2006/0083927 A1 | 4/2006 | Von Ehr, II |
| 2006/0110599 A1 | 5/2006 | Honma et al. |
| 2006/0121275 A1 | 6/2006 | Poulin et al. |
| 2006/0159916 A1 | 7/2006 | Dubrow et al. |
| 2006/0165914 A1 | 7/2006 | Abrahamson |
| 2006/0177602 A1 | 8/2006 | Dijon et al. |
| 2006/0198956 A1 | 9/2006 | Eres |
| 2006/0205304 A1 | 9/2006 | Marzolin et al. |
| 2007/0020167 A1 | 1/2007 | Han et al. |
| 2007/0048521 A1 | 3/2007 | Istvan |
| 2007/0054105 A1 | 3/2007 | Hsiao |
| 2007/0090489 A1 | 4/2007 | Hart et al. |
| 2007/0092431 A1 | 4/2007 | Resasco et al. |
| 2007/0103048 A1 | 5/2007 | Liu et al. |
| 2007/0110977 A1 | 5/2007 | Al-Haik et al. |
| 2007/0128960 A1 | 6/2007 | Ghasemi Jejhad et al. |
| 2007/0135588 A1 | 6/2007 | Diakoumakos et al. |
| 2007/0141114 A1 | 6/2007 | Muisener et al. |
| 2007/0148340 A1 | 6/2007 | Kalkanoglu et al. |
| 2007/0148429 A1 | 6/2007 | McGrath et al. |
| 2007/0183959 A1 | 8/2007 | Charlier et al. |
| 2007/0189953 A1 | 8/2007 | Bai et al. |
| 2007/0205394 A1 | 9/2007 | Furman et al. |
| 2007/0218280 A1 | 9/2007 | Yabuki et al. |
| 2007/0259128 A1 | 11/2007 | Parsapour |
| 2007/0298669 A1 | 12/2007 | Barrera et al. |
| 2008/0014431 A1 | 1/2008 | Lashmore et al. |
| 2008/0020193 A1 | 1/2008 | Jang et al. |
| 2008/0023396 A1 | 1/2008 | Fugetsu |
| 2008/0048364 A1 | 2/2008 | Armeniades et al. |
| 2008/0053922 A1 | 3/2008 | Honsinger, Jr. et al. |
| 2008/0075954 A1 | 3/2008 | Wardle et al. |
| 2008/0118753 A1 | 5/2008 | Poulin et al. |
| 2008/0135815 A1 | 6/2008 | Glatkowski et al. |
| 2008/0160286 A1 | 7/2008 | Asrar et al. |
| 2008/0160302 A1 | 7/2008 | Asrar et al. |
| 2008/0170982 A1 | 7/2008 | Zhang et al. |
| 2008/0181839 A1 | 7/2008 | Arendt et al. |
| 2008/0182108 A1 | 7/2008 | Curliss et al. |
| 2008/0187648 A1* | 8/2008 | Hart et al. .................. 427/8 |
| 2008/0213498 A1 | 9/2008 | Drzal et al. |
| 2008/0247938 A1 | 10/2008 | Tsai et al. |
| 2008/0247939 A1 | 10/2008 | Iyuke |
| 2008/0274036 A1* | 11/2008 | Resasco et al. ............ 423/447.2 |
| 2008/0279753 A1 | 11/2008 | Harutyunyan |
| 2008/0280031 A1 | 11/2008 | Drzal et al. |
| 2008/0286564 A1 | 11/2008 | Tsotsis |
| 2008/0287598 A1 | 11/2008 | Lee |
| 2008/0305329 A1 | 12/2008 | D'Silva et al. |
| 2009/0017301 A1 | 1/2009 | Moireau |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0081383 A1 | 3/2009 | Alberding et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0116798 A1 | 5/2009 | Blanchandin et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | Dufaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0286079 A1 | 11/2009 | Barket et al. |
| 2009/0294753 A1 | 12/2009 | Hauge et al. |
| 2009/0311166 A1 | 12/2009 | Hart et al. |
| 2009/0311168 A1 | 12/2009 | Duvall |
| 2009/0318614 A1 | 12/2009 | Chevalier |
| 2009/0325377 A1 | 12/2009 | DiJon et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0098931 A1 | 4/2010 | Daniel et al. |
| 2010/0099319 A1 | 4/2010 | Lashmore et al. |
| 2010/0117764 A1 | 5/2010 | Wang et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0260931 A1 | 10/2010 | Malecki et al. |
| 2010/0260933 A1 | 10/2010 | Malecki et al. |
| 2010/0260998 A1 | 10/2010 | Waicukauski et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0024409 A1 | 2/2011 | Shah et al. |
| 2012/0065300 A1 | 3/2012 | Shah et al. |
| 2012/0070667 A1 | 3/2012 | Malet et al. |
| 2012/0251432 A1 | 10/2012 | Cooper et al. |

FOREIGN PATENT DOCUMENTS

| | | | |
|---|---|---|---|
| CN | 1558441 A | | 12/2004 |
| CN | 1826286 A | | 8/2006 |
| CN | 101012621 | | 8/2007 |
| CN | 101049927 | | 10/2007 |
| CN | 101070250 A | | 11/2007 |
| CN | 101372327 A | | 2/2008 |
| CN | 101173386 A | | 5/2008 |
| CN | 101372329 | | 2/2009 |
| CN | 101378988 | | 3/2009 |
| CN | 101698975 | | 4/2010 |
| EP | 1637828 A2 | | 3/2006 |
| EP | 1939149 A2 | | 7/2008 |
| GB | 2399092 A | | 9/2004 |
| GB | 2458776 A | * | 10/2009 |
| GB | 2458776 A | | 10/2009 |
| IN | 01900DE2008 A | | 3/2010 |
| JP | 2005-213700 | | 8/2005 |
| JP | 2006-342011 | | 12/2006 |
| KR | 100829001 | | 5/2008 |
| TW | 200833861 | | 8/2008 |
| WO | WO-99/58756 | | 11/1999 |
| WO | WO 01-39970 | | 6/2001 |
| WO | WO 03-082733 | | 10/2003 |
| WO | WO-2005/012171 A2 | | 2/2005 |
| WO | WO-2005037470 A2 | | 4/2005 |
| WO | WO-2005075341 A2 | | 8/2005 |
| WO | WO 2006-048531 | | 5/2006 |
| WO | WO-2006/107144 A1 | | 10/2006 |
| WO | WO 2006-115486 | | 11/2006 |

(56) References Cited

FOREIGN PATENT DOCUMENTS

| WO | WO 2007-015710 | 2/2007 |
|---|---|---|
| WO | WO-2007020362 A2 | 2/2007 |
| WO | WO 2007-061854 | 5/2007 |
| WO | WO 2007-089118 | 8/2007 |
| WO | WO 2007-130979 | 11/2007 |
| WO | WO-2007/136755 A2 | 11/2007 |
| WO | WO-2007136613 A2 | 11/2007 |
| WO | WO 2007-149109 | 12/2007 |
| WO | WO 2008-041183 | 4/2008 |
| WO | WO 2008-054541 | 5/2008 |
| WO | WO 2008-085634 | 7/2008 |
| WO | WO 2008-115640 | 9/2008 |
| WO | WO-2008/153609 A1 | 12/2008 |
| WO | WO 2009-004346 | 1/2009 |
| WO | WO 2009-110885 | 9/2009 |
| WO | WO 2010-087903 | 8/2010 |
| WO | WO-2010/129234 A2 | 11/2010 |

OTHER PUBLICATIONS

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

CI, et al., "Direct Growth of Carbon Nanotubes on the Surface of Ceramic Fibers", Carbon, 2005, pp. 883-886, vol. 43, No. 4, Elsevier Ltd.

Franz, et al., "Carbon Single-Wall Nanotube Growth in a Volumetrically Confined Arc Discharge System", U.S. Departement of Energy Journal of Undergraduate Research, pp. 66-69, publication date unknown.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Left., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Kramer, et al., Constrained Iron Catalysts for Single-Walled Carbon Nanotube Growth?, Langmuir 2005, 21, 8466-8470 [http://pubs.acs.org/dol.abs/10.1021/1a0506729].

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, Pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Lux, Rudolf, "PCT Application No. PCT/US2007/086875 Search Report and Written Opinion", May 13, 2008.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

U.S. Appl. No. 12/766,817, filed Apr. 23, 2010.

U.S. Appl. No. 61/295,621, filed Jan. 15, 2010.

U.S. Appl. No. 61/297,704, filed Jan. 22, 2010.

Wang, et al., "Penetration depth of atmospheric pressure plasma surface modification into multiple layers of polyester fabrics", Surface and Coatings Technology, 2007, pp. 77-83, vol. 202, Elsevier B.V.

Wang, et al., "Processing and property investigation of single-walled carbon nanotube (SWNT) buckypaper/epoxy resin matrix nanocomposites", Composites, Part A, 2004, pp. 1225-1232, vol. 35, Elsevier Ltd.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Eliesevier Ltd.

Xu, et al., "Bone-Shaped Nanomaterials for Nanocomposite Applications", Nano Lett., 2003, pp. 1135-1139, vol. 3, No. 8, American Chemical Society.

(56) References Cited

OTHER PUBLICATIONS

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al,, "Carbon Nanotubes with a Triangular Cross-section, Fabricated Using Anodic Porous Alumina as the Temple", Adv, Mater., 204, pp. 429-432, vol. 16, No. 5, Wiley-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Mayya, et al., "Diameter Controlled Synthesis of Carbon Nanotubes by CVD Using Steric-Stabilized Nanoparticle Catalysts", NSTI-Nanotech, 2006, vol. 1, pp. 98-101.

Definition of nanoparticle provided by Dictionary.com, accessed Nov. 2, 2012, retrieved from <http://dictionary.reference.com/browse/nanoparticle>.

Zhong, et al., "Growth Kinetics of 0.5cm Vertically Aligned Single-Walled Carbon Nanotubes", The Journal of Physical Chemistry B (Letters), Feb. 6, 2007, pp. 1907-1910, vol. 111, No. 8.

"Conformal coating", The Free Dictionary by Farlex, last viewed Jan. 15, 2013, retrieved from <http://encyclopedia.thefreedictionary.com/conformal+coating>.

Keyvani, "Huge Opportunities for Industry of Nanofibrous Concrete Technology," International Journal of Nanoscience and Nonotechnology, Dec. 2007, pp. 3-11, vol. 3, No. 1.

Yamamoto, et al., "High-yield growth and morphology control of aligned carbon nanotubes on ceramic fibers for multifunctional enhancement of structural composites," Carbon, Mar. 2009, vol. 47, No. 3, pp. 551-560.

Ci, et al., "Direct growth of carbon nanotubes on the surface of ceramic fibers," Carbon, Jan. 2005, vol. 43, No. 4, pp. 883-886.

Qu, et al., "Carbon Microfibers Sheathed with Aligned Carbon Nanotubes: Towards Multidimensional Multicomponent and Multifunctional Nanonmaterials," SMALL, 2006, pp. 1052-1059, vol. 2, No. 8-9.

* cited by examiner

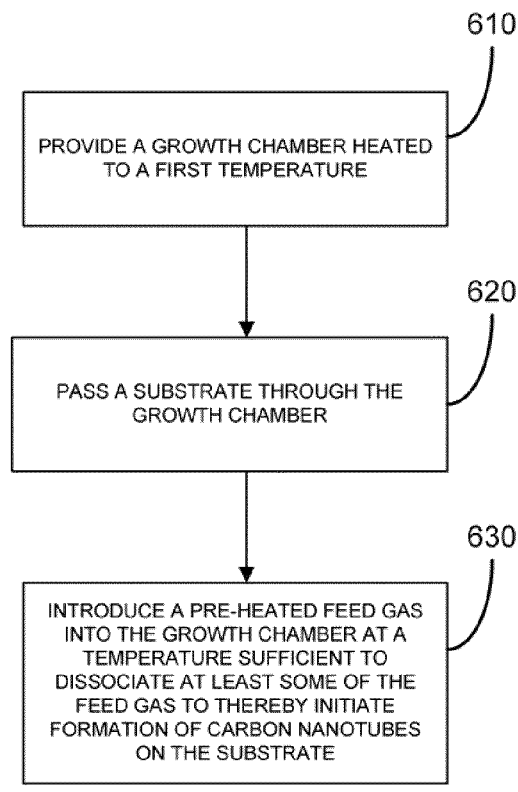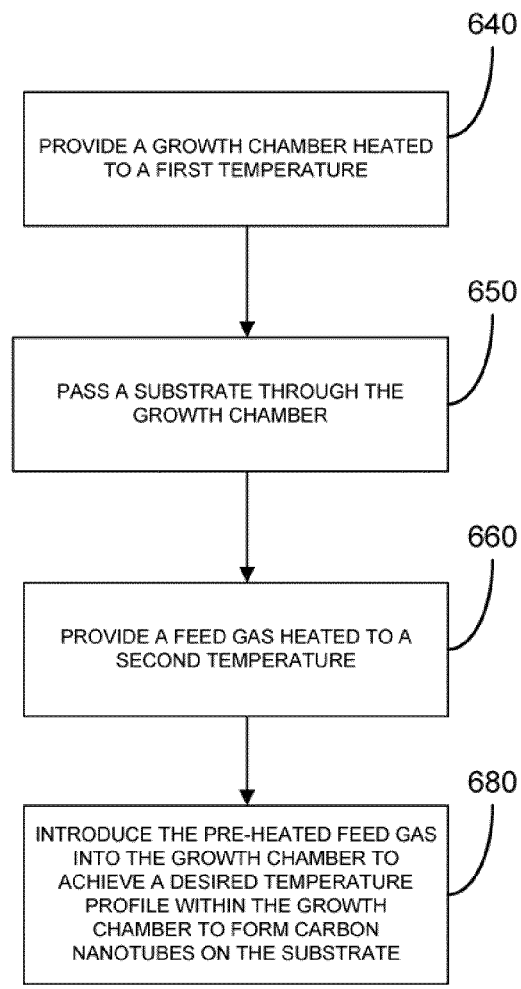
*FIG. 6A*  *FIG. 6B*

LOW TEMPERATURE CNT GROWTH USING GAS-PREHEAT METHOD

STATEMENT OF RELATED APPLICATIONS

This application claims priority to U.S. Provisional Application No. 61/155,935 filed Feb. 27, 2009, which is incorporated herein by reference in its entirety.

STATEMENT REGARDING FEDERALLY SPONSORED RESEARCH OR DEVELOPMENT

Not applicable.

FIELD OF INVENTION

The present invention relates in general to a system, method and apparatus for the continuous synthesis of carbon nanotubes.

BACKGROUND

Carbon nanotubes ("CNTs") exhibit impressive physical properties. The strongest CNTs exhibit roughly eighty times the strength, six times the toughness (i.e., Young's Modulus), and one-sixth the density of high carbon steel. Hence, developing CNTs within composite materials having these desirable properties is of significant interest.

A composite material is a heterogeneous combination of two or more constituents that differ in form or composition on a macroscopic scale. Two constituents of a composite include a reinforcing agent and a resin matrix. In a fiber-based composite, the fibers act as a reinforcing agent. The resin matrix keeps the fibers in a desired location and orientation and also serves as a load-transfer medium between fibers within the composite. Due to their exceptional mechanical properties, CNTs are used to further reinforce the fiber in composite materials.

To realize the benefit of fiber properties with a composite, a good interface between the fibers and the matrix should exist. This can be achieved through the use of a surface coating, typically referred to as "sizing." The sizing provides a physio-chemical link between the fiber and the resin matrix and has a significant impact on the mechanical and chemical properties of the composite. The sizing can be applied to fibers during their manufacture. Generally, conventional CNT synthesis has required high temperatures in the range of 700° C. to 1500° C. However, many fibers and sizings on which CNTs are to be formed are adversely affected by the high temperatures generally required for CNT synthesis in conventional processes. Alternative methods and systems for providing low temperature in-line CNT synthesis are desired.

SUMMARY OF THE INVENTION

According to an aspect of the present invention, a method for synthesizing carbon nanotubes (CNT) comprises the steps of providing a growth chamber, the growth chamber being heated to a first temperature sufficiently high to facilitate a growth of carbon nanotubes; passing a substrate through the growth chamber; and introducing a feed gas into the growth chamber pre-heated to a second temperature sufficient to dissociate at least some of the feed gas into at least free carbon radicals to thereby initiate formation of carbon nanotubes onto the substrate.

According to another aspect of the present invention, a method for synthesizing carbon nanotubes (CNT) comprises the steps of providing a growth chamber, the growth chamber being heated to a first temperature; passing a substrate through the growth chamber; providing a feed gas pre-heated to a second temperature; and introducing into the growth chamber the pre-heated feed gas wherein the second temperature is selected to achieve a desired temperature profile within the growth chamber to allow for the formation of carbon nanotubes on the substrate.

According to still another embodiment of the present invention, a system for synthesizing carbon nanotubes (CNT) comprises a growth chamber that receives a substrate having a catalyst disposed thereon; a heater for heating the growth chamber to a first temperature, the first temperature sufficiently high to facilitate a growth of carbon nanotubes on the substrate; and a gas pre-heater that heats a feed gas to a second temperature and introduces the feed gas into the growth chamber to synthesize carbon nanotubes on the substrate.

BRIEF DESCRIPTION OF THE DRAWINGS

FIG. 6A is a process flow chart for a method for growing CNT at low temperatures using gas pre-heat, according to an embodiment of the invention;

FIG. 6B is another process flow chart for a method for growing CNT at low temperatures using gas pre-heat, according to an embodiment of the invention;

DETAILED DESCRIPTION

Figure 1:
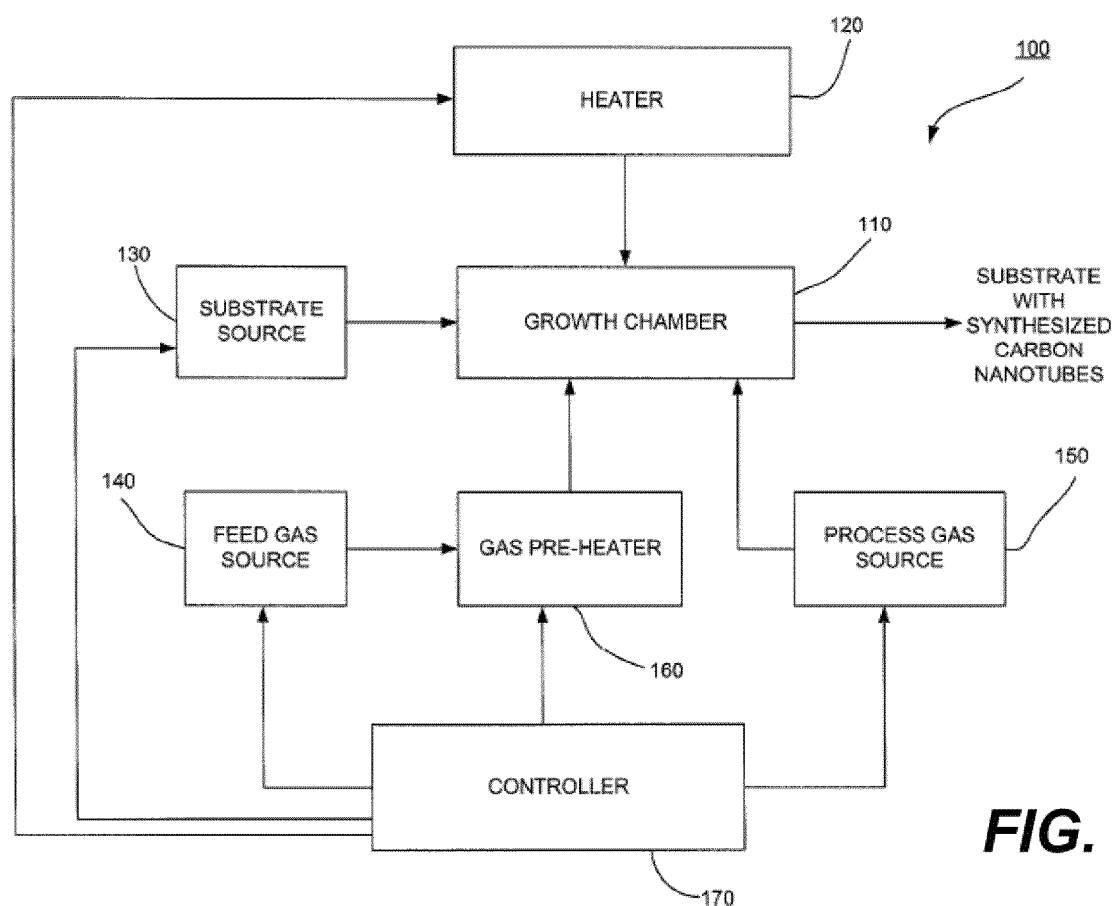
FIG. 1 is a schematic diagram of a system for low temperature CNT growth using gas pre-heat, according to an embodiment of the invention.

The present invention relates in general to a system, method and apparatus for the continuous synthesis of CNTs. CNTs can be advantageously synthesized on a variety of substrates to produce carbon nanotube-infused ("CNT-infused") substrates. The infusion of CNTs to a substrate can serve many functions including, for example, as a sizing agent to protect against damage from moisture, oxidation, abrasion, and compression. A CNT-based sizing can also serve as an interface between the substrate and a matrix material in a composite. The CNTs can also serve as one of several sizing agents coating the substrate. Moreover, CNTs infused on a substrate can alter various properties of the substrate, such as thermal and/or electrical conductivity, and/or tensile strength, for example. The processes employed to make CNT-infused substrates can provide CNTs with substantially uniform length and distribution to impart their useful properties uniformly over the substrate that is being modified. Furthermore, the processes disclosed herein can generate CNT-infused substrates of spoolable dimensions.

The system and method disclosed herein also make it possible to use various sizing and substrates such as polyaramid fibers including Kevlar, which cannot withstand high operating temperatures utilized in some conventional carbon nanotube synthesis processes. In addition, the system and the method of this invention can allow an inexpensive substrate to be used for the formation of composite material infused with CNTs due at least in part to the relatively low temperature in the growth chamber. A further advantage of the present system and method is that continuous synthesis of CNTs can be obtained by proper regulation of the pre-heated feed gas flow rate, carbon concentration, substrate feed rate, the temperature of the growth chamber, and the pre-heated feed gas temperature, facilitating mass production of composite materials with CNTs. The continuous synthesis process can be carried out on a dynamic substrate, e.g., a substrate entering a growth cavity through an inlet, traversing through the growth cavity and exiting from an outlet of the growth cavity. In some embodiments, the process gas is pre-heated in an external heater and the feed gas is pre-heated by the pre-heated process gas immediately prior to its introduction to the growth chamber. This reduces the heat loss and the loss of free carbon radicals resulting from their reaction with the surfaces of the system components (e.g., forming soot on the process equipment).

The processes described herein allow for the continuous production of CNTs of uniform length and distribution along spoolable lengths of tow, tapes, fabrics and other 3D woven structures. While various mats, woven and non-woven fabrics and the like can be functionalized by processes of the invention, it is also possible to generate such higher ordered structures from the parent tow, yarn or the like after CNT functionalization of these parent materials. For example, a CNT-infused woven fabric can be generated from a CNT-infused fiber tow.

The term "substrate" is intended to include any material upon which CNTs can be synthesized and can include, but is not limited to, a carbon fiber, a graphite fiber, a cellulosic fiber, a glass fiber, a metal fiber, a ceramic fiber, an aramid fiber, or any substrate comprising a combination thereof. The substrate can include fibers or filaments arranged, for example, in a fiber tow (typically having about 1000 to about 12000 fibers) as well as planar substrates such as fabrics, tapes, or other fiber broadgoods, and materials upon which CNTs can be synthesized.

As used herein the term "spoolable dimensions" refers to substrates having at least one dimension that is not limited in length, allowing for the material to be stored on a spool or mandrel. Substrates of "spoolable dimensions" have at least one dimension that indicates the use of either batch or continuous processing for CNT infusion as described herein. One substrate of spoolable dimensions that is commercially available is exemplified by AS4 12 k carbon fiber tow with a tex value of 800 (1 tex=1 g/1,000 m) or 620 yard/lb (Grafil, Inc., Sacramento, Calif.). Commercial carbon fiber tow, in particular, can be obtained in 5, 10, 20, 50, and 100 lb. (for spools having high weight, usually a 3 k/12K tow) spools, for example, although larger spools may require special order.

As used herein, the term "carbon nanotube" (CNT, plural CNTs) refers to any of a number of cylindrically-shaped allotropes of carbon of the fullerene family including graphene, vapor grown carbon fibers, carbon nanofibers, single-walled CNTs (SWNTs), double-walled CNTs (DWNTs), and multi-walled CNTs (MWNTs). CNTs can be capped by a fullerene-like structure or open-ended. CNTs include those that encapsulate other materials.

As used herein "uniform in length" refers to length of CNTs grown in a reactor. "Uniform length" means that the CNTs have lengths with tolerances of plus or minus about 20% of the total CNT length or less, for CNT lengths varying from between about 1 micron to about 500 microns. At very short lengths, such as 1-4 microns, this error can be in a range from between about plus or minus 20% of the total CNT length up to about plus or minus 1 micron, that is, somewhat more than about 20% of the total CNT length.

As used herein "uniform in distribution" refers to the consistency of density of CNTs on a substrate. "Uniform distribution" means that the CNTs have a density on the substrate with tolerances of plus or minus about 10% coverage defined as the percentage of the surface area of the substrate covered by CNTs. This is equivalent to $\pm 1500$ CNTs/$\mu m^2$ for an 8 nm diameter CNT with 5 walls. Such a value assumes the space inside the CNTs as fillable.

As used herein, the term "infused" means bonded and "infusion" means the process of bonding. Such bonding can involve direct covalent bonding, ionic bonding, pi-pi, and/or Van der Waals force-mediated physisorption. For example, in some embodiments, the CNTs can be directly bonded to the substrate. Bonding can be indirect, such as the CNT infusion to the substrate via a coating and/or an intervening transition metal nanoparticle disposed between the CNTs and substrate. In the CNT-infused substrates disclosed herein, the CNTs can be "infused" to the substrate directly or indirectly. The particular manner in which a CNT is "infused" to a substrates can be referred to as a "bonding motif."

As used herein, the term "transition metal" refers to any element or alloy of elements in the d-block of the periodic table. The term "transition metal" also includes salt forms of the base transition metal element such as oxides, carbides, chlorides, chlorates, acetates, sulfides, sulfates, nitrides, nitrates and the like.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, serve as catalysts for CNT growth on the substrates.

As used herein, the term "feed gas" refers to any carbon compound gas, solid, or liquid that can be volatilized, nebulized, atomized, or otherwise fluidized and is capable of dissociating or cracking at high temperatures into at least some free carbon radicals and which, in the presence of a catalyst, can form CNTs on the substrate.

As used herein, the term "free carbon radicals" refers to any reactive carbon species capable of adding to the growth of a CNT. Without intending to be limited by theory, it is believed that a free carbon radical adds to the growth of a CNT by associating with a CNT catalyst on the surface of the substrate to form a CNT.

As used herein, the term "sizing agent," "fiber sizing agent," or just "sizing," refers collectively to materials used in the manufacture of some substrates (e.g., carbon fibers) as a coating to protect the integrity of substrate, provide enhanced interfacial interactions between a substrate and a matrix material in a composite, and/or alter and/or enhance particular physical properties of a substrate. In some embodiments, CNTs infused to substrates can behave as a sizing agent.

As used herein, the term "material residence time" refers to the amount of time a discrete point along a substrate of spoolable dimensions is exposed to CNT growth conditions during the CNT infusion processes described herein. This definition includes the residence time when employing multiple CNT growth chambers.

As used herein, the term "linespeed" refers to the speed at which a substrate of spoolable dimensions can be fed through the CNT infusion processes described herein, where linespeed is a velocity determined by dividing CNT chamber(s) length by the material residence time.

Referring to FIG. 1, there is illustrated a schematic diagram of a system 100 for synthesis of CNTs using a low-temperature process. According to some embodiments of the invention, system 100 includes a growth chamber 110, a heater 120, a substrate source 130, a feed gas source 140, a process or carrier gas source 150, a gas pre-heater 160, and a controller 170.

In some embodiments, growth chamber 110 is an open-air continuous operation, flow-through reactor. The system can operate at or slightly above atmospheric pressure. Growth chamber 110 includes a small volume cavity (not shown) through which the substrate enters the inlet and exits from the outlet continuously, thereby facilitating continuous synthesis of CNTs on the substrate. The cavity can have a rectangular, circular, oval or similar cross section based on the size and shape of the substrate passing through the growth chamber. The volume of the growth chamber will be based, at least in part, on the initial and final size of the substrate as it passes through the growth chamber, with consideration given to the increase in the volume of the substrate based on the synthesis of the CNTs. In some embodiments, the volume of the growth chamber less than or equal to about 7000% of the volume of the substrate being fed to growth chamber 110. A substrate in the form of a fiber tow, for example, allows for a continuous feed of substrate from an upstream substrate source 130.

Figure 3:
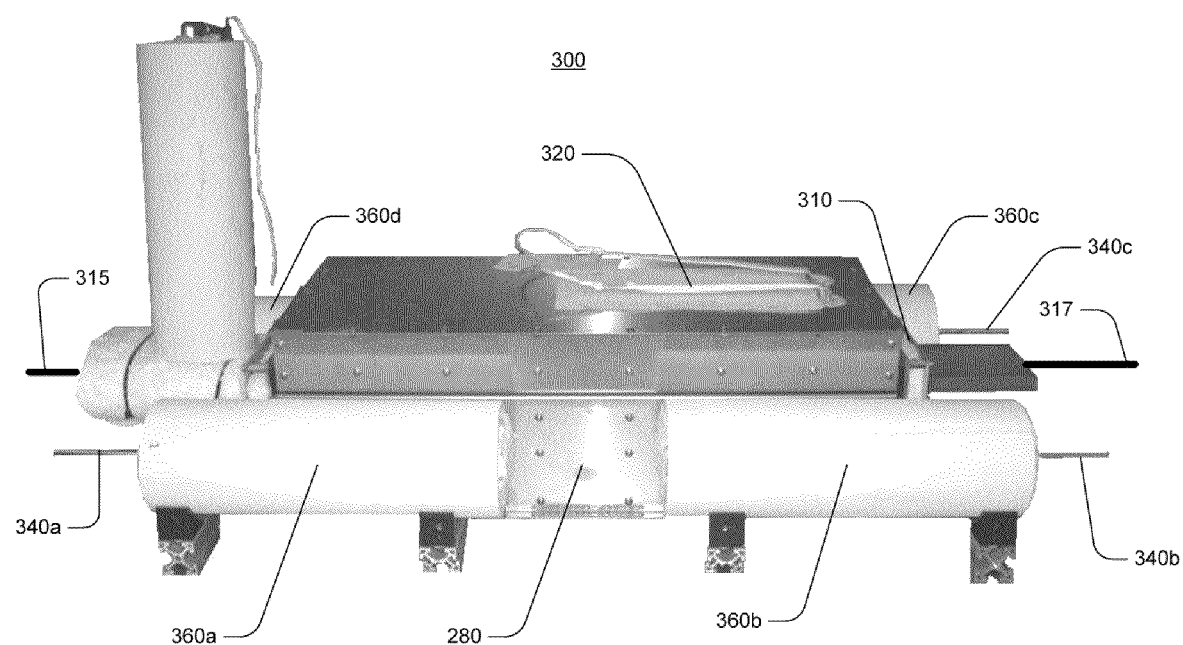
FIG. 3 illustrates exemplary components of the system of FIG. 2, according to an embodiment of the invention.
Figure 4:
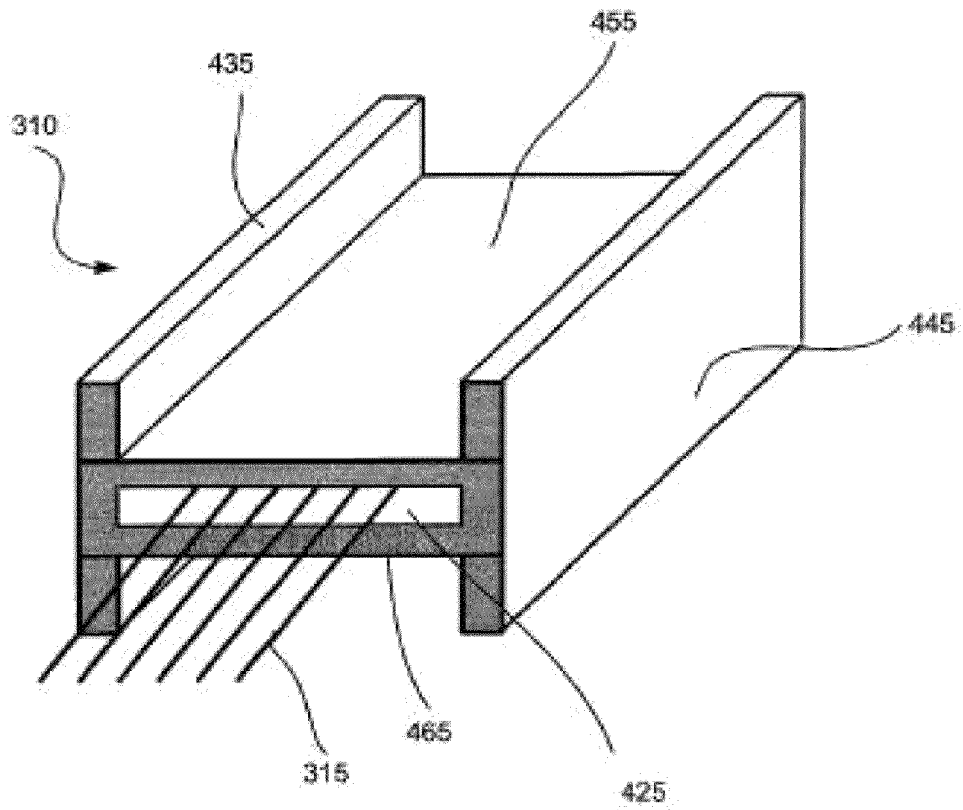
FIG. 4 illustrates a schematic perspective view of the growth chamber of FIG. 3, according to an embodiment of the invention.

Growth chamber 110 can continuously receive a gas mixture containing a feed gas and optionally a process (i.e., a carrier gas) into the chamber cavity. Growth chamber 110 can be formed by two vertical members 435, 445, as shown in FIG. 4, and two horizontal members 455, 465 (of FIG. 4), arranged in a generally H-shaped configuration. Horizontal members 455, 465 with vertical members 435, 445 define small volume cavity 425 through which substrate 315 (of FIG. 3) passes. In some embodiments, members 435, 445, 455, 465 are made of stainless steel. In other embodiments, other metals and/or alloys can be used which can withstand high operating temperatures, do not react with the elements fed through cavity 425, and are generally impermeable to these elements.

Growth chamber 110 can also continuously receive a substrate 315 (of FIG. 3) in the form of a fiber, which can be coated with sizing and/or catalyst particles, at a given rate controlled by controller 170. The substrate can pass through cavity 425, which can be maintained at a first temperature T1 by controller 170. Temperature T1 is sufficiently high to enable the growth of CNTs on the substrate but no so high as to adversely impact the physical and chemical properties of the substrate. In some embodiments, temperature T1 can be sufficiently high to remove any fiber sizing. In other embodiments, temperature T1 can be high enough to promote CNT growth without damaging or removing the fiber sizing. By way of example, cavity 425 can be maintained at a temperature of from about 450° C. to about 650° C.

Again referring to FIG. 1, heater 120 heats cavity 425 of growth chamber 110 and maintains the operational temperature T1 of growth chamber 110 at a pre-set level. Heater 120 can be controlled by controller 170. In some embodiments, heater 120 can be controlled by a separate controller, which can be linked to controller 170. Heater 120 can be any suitable device capable of maintaining the growth chamber 110 at about operating temperature T1. In some embodiments, heater 120 can comprise a heating coil contained in each of horizontal members 455, 465. Horizontal members 455, 465 are closely spaced to have a small gap therebetween. Because the gap between horizontal members 455, 465 is small, the gap can be uniformly heated, without any significant temperature gradient therein. Heater 120 can heat the surfaces of horizontal members 455, 465, which in turn can heat the gap therebetween. In some embodiments, the gap between members 455, 465 can be about 5 millimeters (mm) to about 20 mm. In another embodiment, the gap between horizontal members 455, 465 is about 9.5 mm.

Substrate source 130 can be adapted to continuously supply a substrate to growth chamber 110. The substrate can include any of those materials listed above as being suitable for use as a substrate. In some embodiments, the substrate can comprise E-glass fibers coated with a sizing material. In other embodiments, the substrate can include other fibers, such as inexpensive glass fibers and carbon fibers. In still other embodiments, the substrate can be a aramide fiber such as Kevlar. Fibers can be supplied in bundles, known as "tows." A tow can have between about 1000 to about 12000 fiber filaments. In some embodiments, a fiber filament can have a diameter of about 10 microns, although fiber filaments having other diameters can be used. Fibers can also include a carbon yarn, a carbon tape, a unidirectional carbon tape, a carbon fiber-braid, a woven carbon fabric, a non-woven carbon fiber mat, a carbon fiber ply, a 3D woven structure and the like.

In some embodiments, the substrate can be coated with a sizing. Sizing can vary widely in type and function and can include, but is not limited to, surfactants, anti-static agents, lubricants, siloxanes, alkoxysilanes, aminosilanes, silanes, silanols, polyvinyl alcohol, starch, and mixtures thereof. Such sizing can be used to protect the CNTs themselves or provide further properties to the fiber not imparted by the presence of the infused CNTs. In some embodiments, any sizing can be removed prior CNT synthesis. In some embodiments, sizing removal can be achieved by thermal means at first temperature T1.

The fibers supplied to growth chamber 110 from source 130 can be coated with a catalyst to initiate the synthesis of CNTs. Such a catalyst can take the form of nano-sized particles of a catalyst. The catalyst employed can be a transition metal nanoparticle which can be any d-block transition metal as described above. In addition, the nanoparticles (NPs) can include alloys and non-alloy mixtures of d-block metals in elemental form or in salt form, and mixtures thereof. Such salt forms include, without limitation, oxides, carbides, chlorides, chlorates, acetates, sulfides, sulfates, nitrides, nitrates and mixtures thereof. Non-limiting exemplary transition metal NPs include Ni, Fe, Co, Mo, Cu, Pt, Au, and Ag and salts thereof. In some embodiments, such CNT-forming catalysts are disposed on the substrate material by applying or infusing a CNT-forming catalyst directly to the substrate simultaneously with barrier coating deposition. Many of these transition metal catalysts are commercially available from a variety of suppliers, including, for example, Ferrotec Corporation (Bedford, N.H.).

Without intending to be bound by theory, transition metal NPs, which can serve as a CNT-forming catalyst, can catalyze CNT growth by forming a CNT growth seed structure. In some embodiments, the CNT-forming catalyst can remain at the base of the substrate and be infused to the surface of the substrate. In such a case, the seed structure initially formed by the transition metal NP catalyst is sufficient for continued non-catalyzed seeded CNT growth without allowing the catalyst to move along the leading edge of CNT growth, as often observed in the art. In such a case, the NP serves as a point of attachment for the CNT to the substrate. In some embodiments, the CNT growth catalyst can follow the leading edge of the growing nanotube. In such cases, this can result in direct bonding of the CNTs to the substrate. Regardless of the nature of the actual bonding motif formed between the CNTs and the substrate, the infused CNT is robust and allows the CNT-infused substrate to exhibit carbon nanotube properties and/or characteristics.

The substrate can be coated with the catalyst prior to entering growth chamber 110. The operation of disposing a catalyst on the substrate can be accomplished by spraying or dip coating a solution or by gas phase deposition via, for example, a plasma process. In some embodiments, the substrate can be coated with the catalyst by immersing the substrate in a colloidal solution or a metal salt solution such as iron nitrate. In other embodiments, the fibers can be passed through nickel nitrate or cobalt nitrate metal salt solution. Other catalyst solutions or applications can also be used. In some embodiments, commercial dispersions of CNT-forming transition metal nanoparticle catalyst are available and are used without dilution, in other embodiments commercial dispersions of catalyst can be diluted. Whether to dilute such solutions can depend on the desired density and length of CNT to be grown. Catalyst solutions used for applying the catalyst to the substrate can comprise any solvent that allows the catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to about 1:10000 catalyst to solvent.

Again referring to FIG. 1, feed gas source 140 is in fluid communication with gas pre-heater 160 and can be controlled by controller 170. In another embodiment, gases from feed gas source 140 and process gas source 150 are mixed before the gas mixture is supplied to gas pre-heater 160.

The feed gas can be any carbon compound gas, solid, or liquid that can be volatilized, nebulized, atomized, or otherwise fluidized and is capable of dissociating or cracking at high temperatures into at least some free carbon radicals and which, in the presence of a catalyst, can form CNTs on the substrate. In some embodiments, the feed gas can comprise acetylene, ethylene, methanol, methane, propane, benzene, natural gas, or any combination thereof. In some exemplary embodiments, when a feed gas comprising acetylene is heated to a temperature T2 (e.g., between about 550° C. and about 1000° C.) and fed into cavity 425 (see FIG. 4) of growth chamber 110, at least a portion of the acetylene dissociates into carbon and hydrogen in the presence of a catalyst on the substrate. The higher temperature T2 facilitates rapid dissociation of acetylene but may adversely impact the physical and chemical properties of the substrate and/or any sizing materials present. By heating the feed gas to the higher temperature T2, external to growth chamber 110, while maintaining the growth chamber at a lower temperature T1, the integrity of the substrate and any sizing materials or other coatings can be preserved during CNT formation.

The use of a feed gas such as acetylene can reduce the need for a separate process of introducing hydrogen into growth cavity 425 which can be used to reduce a catalyst containing an oxide. The dissociation of a feed gas may provide hydrogen, which can reduce the catalyst particles to pure particles or at least to an acceptable oxide level. For example, if the catalyst is an iron oxide, such an iron oxide particle is not conducive to the synthesis of CNTs because the carbon radicals from the feed gas can react with the oxide on the substrate to form carbon dioxide and carbon monoxide instead of forming CNTs. The chemical composition of the oxide can further prevent the diffusion of free carbon radicals through the catalyst particles thereby preventing or reducing the growth of CNTs. This can reduce the amount of carbon radicals available for the formation of CNTs and the growth rate of CNTs. The hydrogen from acetylene effectively removes the oxide from the catalyst particles on the substrate and prevents the reaction of free carbon radicals with the oxide.

A process gas can be used to remove oxygen, which is detrimental to the growth of CNTs, from growth cavity 425 (of FIG. 4). If oxygen is present in growth cavity 425 (of FIG. 4), the carbon radicals formed from the feed gas tend to react with the oxygen to form carbon dioxide and carbon monoxide, instead of forming CNTs on the substrate. The process gas can comprise any inert gas that does not detrimentally impact the CNT growth process. In some embodiments, the process gas can include, but is not limited to, nitrogen, helium, argon, or any combination thereof. In some embodiments, the flow rates of the feed gas and process gas are controlled by controller 170. In some embodiments, the feed gas can be provided in a range between about 0% to about 15% of the total gas mixture.

One of ordinary skill in the art will recognize that controller 170 can be adapted to independently sense, monitor and control system parameters including one or more of substrate feed rate, first temperature, second temperature, feed gas supply, and process gas supply. Controller 170 can be an integrated, automated computerized system controller that receives parameter data and performs various automated adjustments of control parameters or a manual control arrangement, as is understood by one of ordinary skill in the art.

In some embodiments as shown in FIG. 1, the feed gas can be pre-heated in gas pre-heater 160 to a temperature T2 before it is introduced into growth cavity 425 (of FIG. 4). In some embodiments, T2 can range from about 550° C. to about 1000° C. Gas pre-heater 160 is external to growth chamber 110 and operates to pre-heat the feed gas, process gas, or a mixture of the feed gas and the process gas prior to the introduction into growth chamber 110. Gas pre-heater 160 can be thermally isolated from growth chamber 110 to prevent unintentional heating of growth chamber 110. Gas pre-heater 160 can be thermally insulated to prevent heat loss from the heated gas or gas mixture to the environment. Gas pre-heater 110 can comprise any device capable of heating a gas to temperature T2. In some embodiments, gas pre-heater 160 can include, but is not limited to, resistive heat torches, coiled tubes heated inside a resistively heated ceramic heater, induction heating, hot filaments in the gas stream, and infrared heating.

In some embodiments, some or all of the parts of the gas pre-heater 160 can be constructed of metal, in particular stainless steel. This use of metal, and stainless steel in particular, can lead to carbon deposition (i.e., soot and by-product formation). Once carbon deposits to a monolayer on the walls of the device, carbon will readily deposit over itself. This process can occur at an elevated rate in narrow passages within the gas pre-heater. As a result, periodic cleaning and maintenance can be employed to prevent any carbon deposition from obstructing the flow of the feed gas, process gas, or both.

Figure 8:
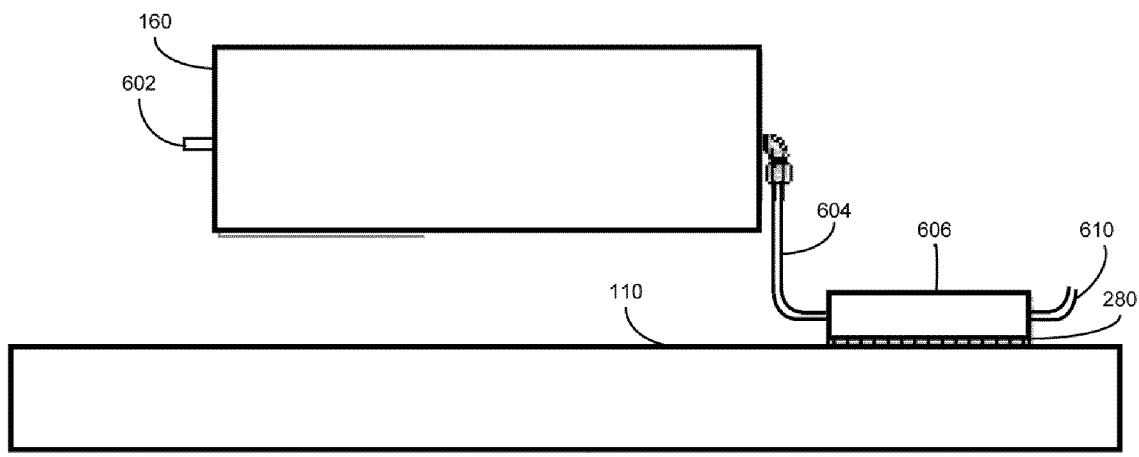
FIG. 8 illustrates a schematic diagram of a gas pre-heater layout according to an embodiment of the present invention.

Referring now to FIG. 8, there is illustrated an embodiment of the pre-heater configuration. In the illustrated embodiment, a diffuser 280 is interposed between gas pre-heater 160 and growth chamber 110 as part of gas manifold 606. In some embodiments, the feed gas and/or a combination of the feed gas and the process gas enter gas pre-heater 160 through gas inlet 602. The gas then passes from the gas pre-heater 160 to gas manifold 606 through conduit 604. Conduit 604 can be insulated and constructed of an appropriate material so as to withstand the temperature and conditions of the pre-heated gas. An additional and optional gas inlet 610 can be provided in gas manifold 606 to allow additional feed gas, process gas, or both to be combined with the heated gas from gas pre-heater 160 to provide a desired gas mixture of feed and process gas at a desired temperature, or flowrate to growth chamber 110. The gas mixture in gas manifold 606 then passes from gas manifold 606 to growth chamber 110 through the diffuser 280. Diffuser 280 allows uniform distribution of the gas mixture over a defined portion of the substrate in growth chamber 110. In one configuration, diffuser 280 takes the form of a plate with uniformly distributed apertures for gas delivery. As shown in FIG. 8, diffuser 280 extends along a selected section of growth chamber 110. In another embodiment, diffuser 280 extends along the entire length of growth chamber 110. In some embodiments, diffuser 280 is positioned adjacent growth chamber 110 in a horizontal direction along vertical members 435, 445 (of FIG. 4). In some embodiments, diffuser 280 is positioned adjacent growth chamber 110 in a vertical direction along horizontal members 455, 465 (of FIG. 4). In yet another configuration, gas pre-heater 160 can be incorporated into diffuser 280. In some embodiments, carbon deposits can occur within the gas pre-heater since the carbon feedstock can break down during heating. However, pre-heating of the feed gas and/or a combination of the feed gas and process gas can ensure that the feed gas is fully pre-heated and breaks down prior to entering growth chamber 110.

Figure 9:
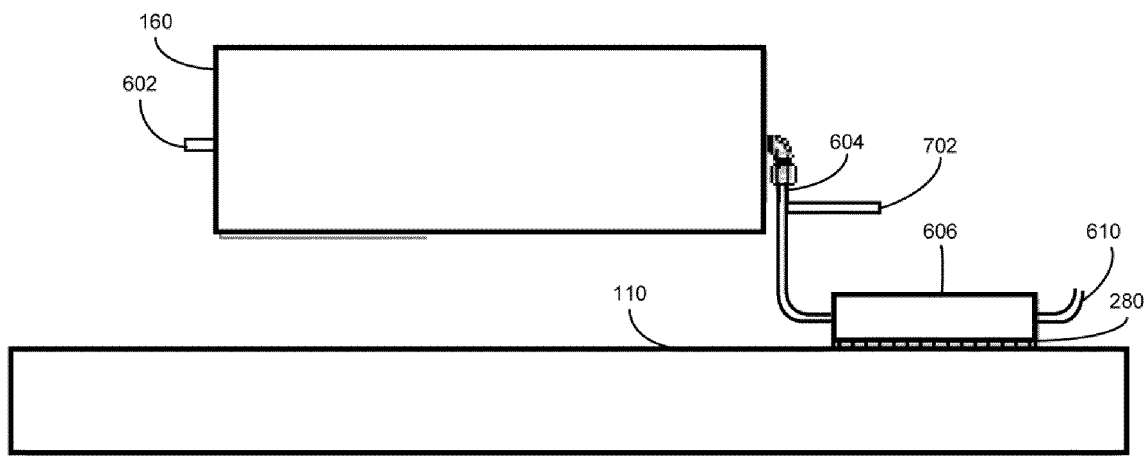
FIG. 9 illustrates a schematic diagram of a gas pre-heater layout according to another embodiment of the present invention.

Another embodiment of the pre-heater configuration is shown in FIG. 9. In this embodiment, the gas pre-heater 160 receives a process gas through inlet 602 and heats the process gas. The heated process gas then passes from the gas pre-heater 160 to gas manifold 606 through conduit 604. A feed gas is then combined with the heated process gas through conduit 702. The feed gas can be at a temperature less than the heated process gas and, in some embodiments, at ambient temperatures. The combination of the heated process gas and the feed gas can provide a gas mixture with a temperature of T2 prior to the mixture entering gas manifold 606 for distribution to growth chamber 110. An additional and optional gas inlet 610 can be provided in gas manifold 606 to allow additional feed gas, process gas, or both to be combined with the heated gas from gas pre-heater 160 to provide a desired gas mixture, temperature, or flow rate to growth chamber 110. The gas in gas manifold 606 then passes from gas manifold 606 to growth chamber 110 through the diffuser 280. In some embodiments using this configuration, the heating of the feed gas can be delayed until near the point at which the feed gas is provided to growth chamber 110. This embodiment can reduce the amount of carbon deposits forming within the gas pre-heater 160 and on the associated equipment, thus reducing the amount and frequency of maintenance required.

Figure 10:
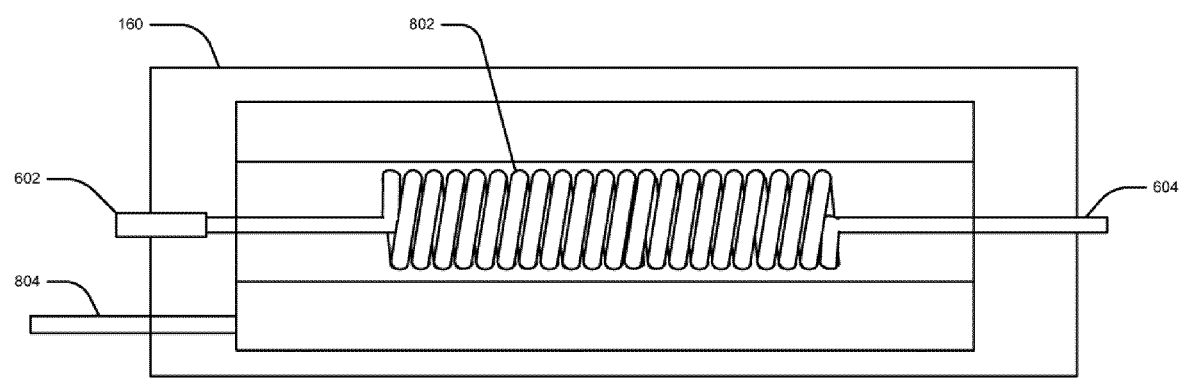
FIG. 10 illustrates a schematic diagram of a gas pre-heater layout according to still another embodiment of the present invention.

FIG. 10 illustrates an exemplary embodiment of the gas pre-heater. In this embodiment, gas pre-heater 160 receives a gas through an inlet 602. The gas then passes through a coil 802 within the gas pre-heater 160. Coil 802 is heated due to a heating element supplying heat to the outside of coil 802. In some embodiments, the heat supplied to coil 802 can be provided by a resistive heating element powered by electrode 804. The entire gas pre-heater can be housed to thermally insulated the pre-heater from the outside environment. As the gas passes through coil 802, the gas is heated and expands within the coil before passing out of the gas pre-heater 160 through outlet conduit 604. The length of coil 802 can be adjusted such that a desired residence time of the gas is achieved within the gas pre-heater 160 so that the gas reaches the desired temperature. The residence time can be determined based in part on the gas flow rate, the inlet temperature, the outlet temperature, and the coil geometry (e.g., diameter, length). The coil can be constructed of a material capable of withstanding the temperatures supplied by the heating element. In some embodiments, the coil can be constructed of a metal or a metal alloy such as stainless steel. As noted above, carbon deposits can form on metal surfaces when the feed gas is heated above the dissociation temperature of the feed gas components. As such, periodic maintenance can be employed to prevent a blockage from forming within the coil. In some embodiments, a coating can be disposed on surfaces subject to carbon deposits to prevent the carbon deposits from forming or building up. Suitable coatings can include, but are not limited to, alumina, silica, and magnesium oxide.

Figure 11:
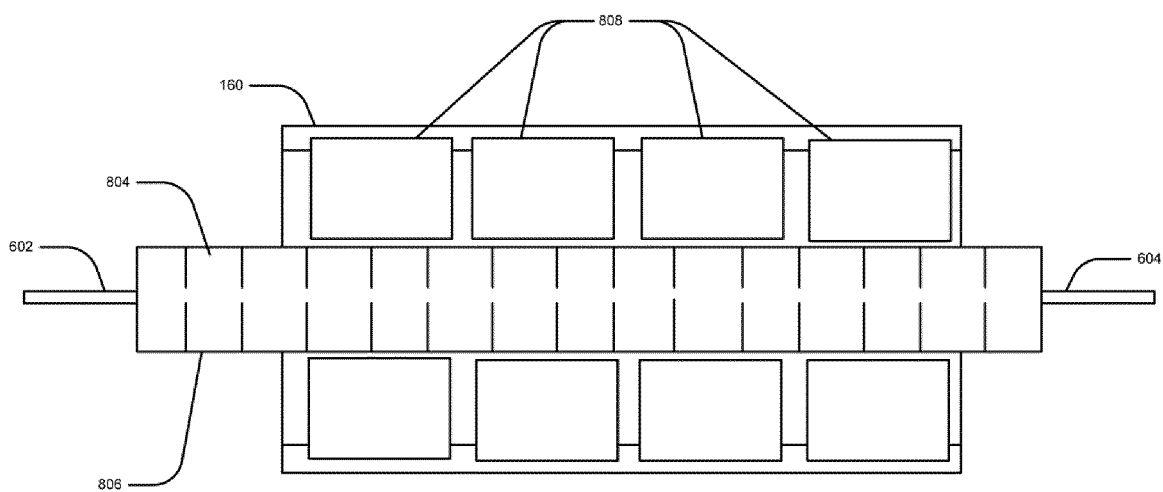
FIG. 11 illustrates a schematic diagram of a gas pre-heater layout according to yet another embodiment of the present invention.

FIG. 11 illustrates another embodiment of a gas pre-heater. In this embodiment, gas pre-heater 160 receives a gas through an inlet 602. The gas then passes through an expansion diffuser 806 within the gas pre-heater 160. Expansion diffuser 806 comprises a plurality of expansion cavities 804 which receive the gas through an inlet orifice whereupon the gas is expanded into the expansion cavity 804. Upon heating, the gas expands and flows into the adjacent expansion cavity through an outlet orifice. In this manner, the gas expands and flows through a series of expansion cavities 804 until the gas reaches the outlet conduit 604. The plurality of expansion cavities 804 are heated due to a heating element supplying heat to the expansion diffuser 806. In some embodiments, the heat supplied to expansion diffuser 806 can be supplied by a resistive heating element 808. The entire gas pre-heater can be housed in an appropriate enclosure that is thermally insulated from the outside environment. A desired residence time of the gas can be achieved within the gas pre-heater 160 so that the gas reaches a desired temperature prior to or upon reaching the outlet conduit 604. The residence time can be determined based in part on the gas flow rate, the inlet temperature, the outlet temperature, and the expansion diffuser geometry (e.g., expansion cavity dimensions, the orifice geometry). The expansion diffuser 806 can be constructed of a material capable of withstanding the temperatures supplied by the heating element. In some embodiments, the expansion diffuser can be constructed of a metal or a metal alloy such as stainless steel. As noted above, carbon deposits can form within the expansion diffuser due to the heating of the gas if a feed gas is present. In this embodiment, carbon deposits can form within the orifices between the expansion cavities. As such, periodic maintenance can be employed.

Figure 12:
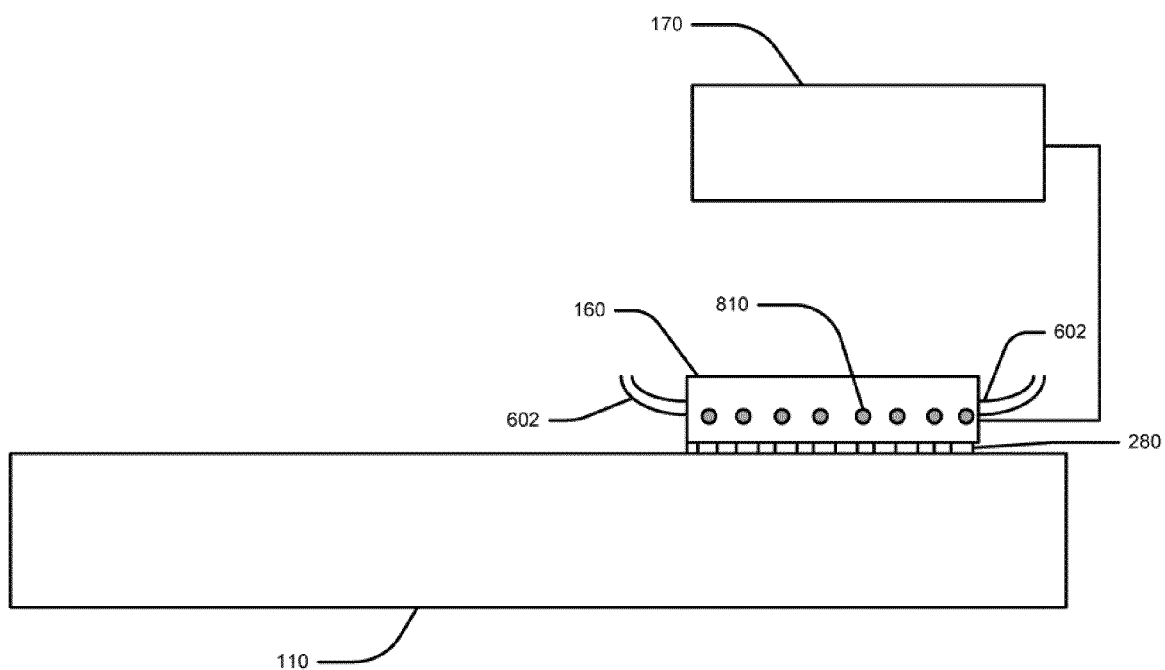
FIG. 12 illustrates a schematic diagram of a gas pre-heater layout according to still another embodiment of the present invention.

FIG. 12 illustrates still another embodiment of a gas pre-heater. In this embodiment, a series of hot filaments 810 are distributed across the diffuser 280. The hot filaments 810 can be resistively heated coils or wires which can be heated to a temperature above the desired preheat temperature T2 and can be controlled by controller 170. The temperature of the filament can be high enough so that the gas passing over the filament can reach a desired temperature even when the gas is in proximity to the filament for a short period of time. In some embodiments, the hot filaments can be at a temperature of about 1000° C. or greater, including about 1100° C., about 1200° C., about 1300° C., about 1400° C., and about 1500° C. The feed gas, the process gas, or a mixture of the two can be introduced to the gas manifold through one or more inlets 602. The gas can then spread across the width of the gas manifold in part due to back pressure build up via the diffuser 280, pass over the series of hot filaments 810, through the diffuser 280, and into the growth chamber 110. In this embodiment, carbon deposition may be less likely to occur in the manifold since gas is heated just prior to entering the growth chamber. Other suitable pre-heater designs can also be used with the processes and systems described herein.

In some embodiments, the gas pre-heater can be used to raise the temperature of the feed gas, the process gas, or a mixture of the feed gas and process gas to a temperature T2. In some embodiments, the temperature T2 can be high enough to cause at least a portion of the feed gas to dissociate or crack into at least some free carbon radicals prior to or at the inlet to the growth chamber. In such embodiments, the temperature T2 can be above the temperature of the growth chamber and substrate, T1. The lower temperature T1 allows the substrate and/or any coating on the substrate (e.g., any catalyst and/or any sizing present) to be protected from any degradation that can occur at temperature T2. Thus the pre-heating of the feed gas can allow for the production of a CNT infused substrate using substrates that would otherwise degrade at CNT elevated temperatures employed in conventional CNT growth processes.

In some embodiments, the temperature T2 can be near temperature T1 so that the introduction of the feed gas at temperature T2 does not adversely affect the temperature profile within the growth chamber. In such embodiments, T2 can be within 25% of temperature T1, or alternatively, within 40% of temperature T1, either higher or lower. In this embodiment, T2 can be a temperature ranging from about 400° C. to about 1000° C. In some embodiments, the temperature T2 can be adjusted in order to create a desired temperature profile or gradient within the growth chamber, or T2 can be adjusted to reduce any temperature gradients within the growth chamber to create a more uniform temperature profile. For example, T2 can be adjusted to match the temperature of the growth chamber at the point at which the feed gas enters the growth chamber. Without intending to be limited by theory, it is believed that controlling the temperature gradients within the growth chamber to achieve a desired temperature profile can help control the growth rate and properties of the CNTs on the substrate.

Now returning to FIG. 3, a system 300 is illustrated for synthesis of CNTs on a substrate at low temperatures. System 300 includes a growth chamber 310, a growth chamber heater 320, and four gas pre-heaters 360a, 360b, 360c, 360d. In the illustrated embodiment, two gas pre-heaters 360a, 360b are positioned on one side of growth chamber 310 and two gas pre-heaters 360c, 360d are positioned on the other side of growth chamber 310. Gas pre-heaters 360a, 360b, 360c, 360d can comprise any of the configurations disclosed herein. In an exemplary embodiment, gas pre-heaters 360a, 360b, 360c, 360d can be configured as ceramic heaters with tube coils (not shown) positioned therein. In the illustrated embodiment, the coils are made of approximately nine (9) feet of stainless steel, through which the feed gas and/or the mixture of the feed gas and the process gas flows and becomes heated.

A gas manifold is centrally placed relative to growth chamber 310 and includes a diffuser 280 for uniformly distributing the gas mixture in growth cavity 425 (of FIG. 4). The preheated feed gas and process gas mixture enters the gas manifold from gas pre-heaters 360a, 360b and is allowed to uniformly diffuse within growth chamber 310. Gas feed lines 340a, 340b supply the gas mixture to the inlet of gas pre-heaters 360a, 360b respectively. Substrate 315 having a catalyst disposed thereon is introduced at a given rate into the inlet of growth chamber 310 where substrate 315 is subject to heating to a temperature T1 (e.g., between about 500° C. to about 600° C.). At the same time, the preheated feed gas and process gas heated to a temperature T2 (e.g., between about 550° C. to about 1000° C.) is introduced into growth chamber 310. At least some of the feed gas can dissociate to enable CNT growth on the substrate. CNT infused substrate 317 with synthesized CNTs exits from growth chamber 310 at the outlet. In some embodiments, the feed rate of the feed gas and process gas mixture is about 15 liters/sec to about 20 liters/sec, both of which can be controlled by controller 170 (of FIG. 1).

Figure 5:
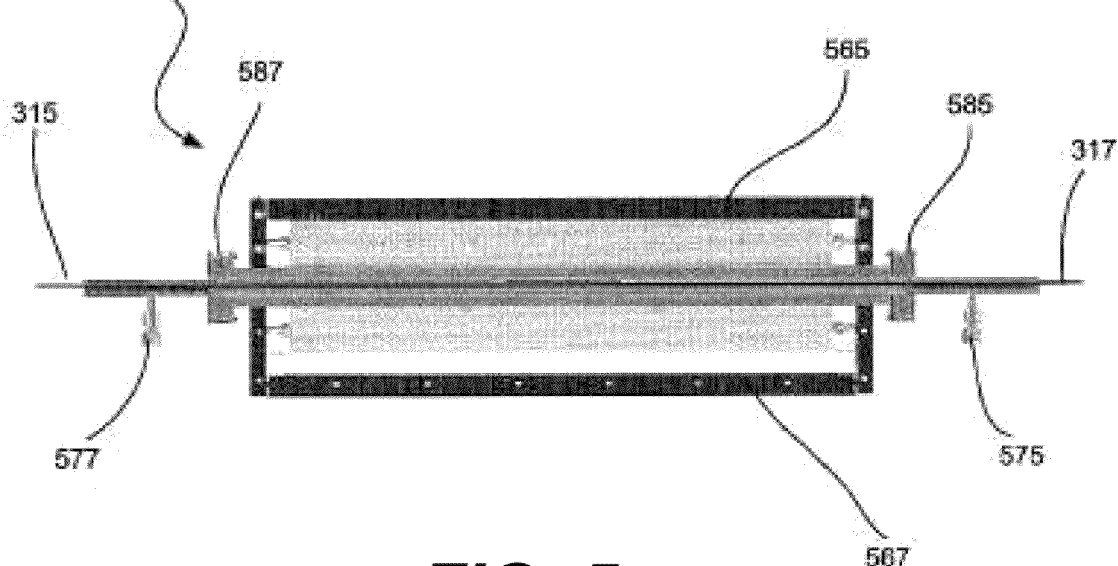
FIG. 5 illustrates a cross-section view of the growth chamber of FIG. 3, according to an embodiment of the invention.

Referring now to FIG. 5, there is illustrated a side view of growth chamber 310. Heaters 565, 567 are arranged on the top and bottom side of H-shaped growth chamber 310. Externally attached and thermally insulated modules 585, 587 provide respective input and output thermal isolation to and from growth chamber 310. The modules 585, 587 are placed at terminal ends of the growth chamber to prevent the hot gases inside the growth chamber from mixing with the oxygen rich gas outside the growth chamber and creating local oxidizing conditions that could adversely affect the substrate entering or exiting growth chamber 310. A cool inert gas, such as nitrogen, is supplied through ports 575, 577 at the inlet and outlet of the growth chamber as a buffer between growth chamber 310 and the external environment to prevent unwanted hot gas mixing with the environment. The incoming cool gas can enter a manifold with built in diffuser plate to spread the cool gas over the corresponding modules.

Figure 2:
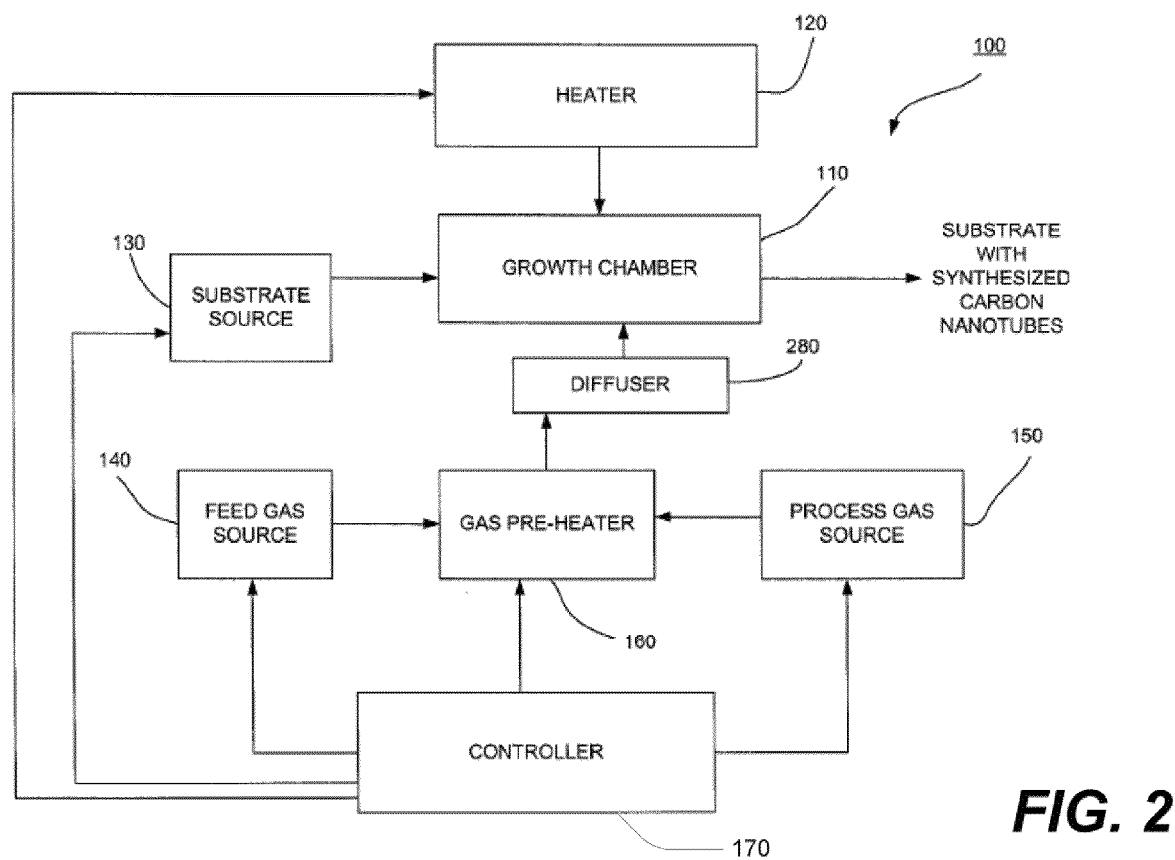
FIG. 2 is a schematic diagram of a system for low temperature CNT growth using gas pre-heat, according to another embodiment of the invention.
Figure 7:
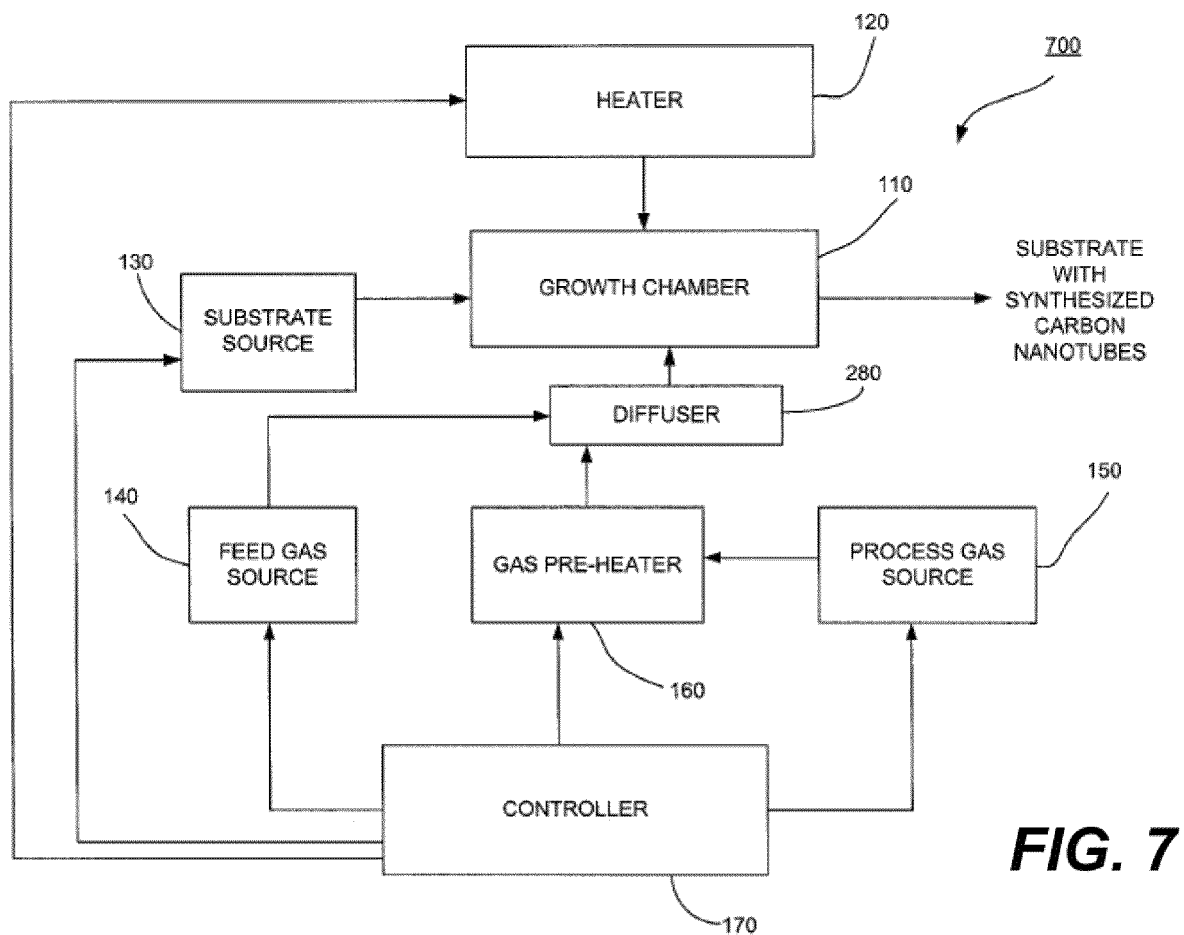
FIG. 7 is a schematic diagram of a system for low temperature CNT growth using gas pre-heat, according to yet another embodiment of the invention.

Referring now to FIG. 7, there is shown yet another embodiment of a system 700 for synthesis of CNTs at low temperature using a gas pre-heater. System 700 is similar to the embodiment of system 200 shown in FIG. 2 with the following exception. In system 700, only the process gas is pre-heated via an external heater to a higher temperature (for example, at about 800° C.). The pre-heated process gas is then mixed with the feed gas, which can be at a lower temperature ranging from about ambient temperature to about 250° C., in diffuser 280. Thus, the feed gas is heated by the pre-heated process gas immediately prior to its introduction into growth cavity 425 (of FIG. 4) of growth chamber 110. In general, any pre-heater design can be used to heat the process gas in this embodiment, including those described above. An advantage of delaying the pre-heating of the feed gas is that the cracking (i.e., dissociating) of the feed gas does not commence until at or near the introduction of the feed gas into growth chamber 110. If the feed gas is cracked earlier, the free carbon radicals can react with the wall of diffuser 280, reducing the amount of carbon radicals available for the growth of CNTs on the substrate.

In FIG. 6A, a flow chart depicting a method for synthesizing CNTs is illustrated. At block 610, a growth chamber is provided and heated to a first temperature T1. The first temperature T1 can be in the range of about 450° C. to about 650° C. At block 620, a substrate is passed through the growth chamber. Temperature T1 is sufficiently high to encourage the synthesis of CNTs on a substrate that continuously passes through the growth chamber in the presence of a pre-heated feed gas that dissociates in the growth chamber into at least free carbon radicals but not so high as to degrade the substrate and/or any sizing disposed on the substrate. At block 630, a feed gas is pre-heated to a second temperature T2 before being introduced into the growth chamber. The second temperature T2 can be in the range of about 550° C. to about 1000° C. Free carbon radicals are readily generated at such temperatures. The feed gas may be heated using any of the methods or devices described herein. For example, the feed gas may be heated by mixing the feed gas with a process gas heated to a temperature above T2 such that the mixture is at a temperature T2 upon entering the growth chamber. The pre-heated feed gas is introduced into the growth chamber where the dissociated free carbon radicals assemble into CNTs on the substrate when coated with appropriate catalyst particles. It has been indicated that the pre-heated feed gas elevates the temperature of the catalyst particles on the substrate, which can enhance rapid CNTs synthesis through the bulk and surface diffusion of carbon on the catalyst particles on the substrate. The pre-heated gas, however, does not have sufficient thermal energy to raise the bulk material temperature of the substrate by any significant degree. Thus, the temperature of the substrate and any optional sizing can be maintained below its degradation temperature as the substrate fiber moves through the growth chamber. In some embodiments, the temperature T1 can be incompatible with the composition of the substrate and/or sizing, but the rate and efficiency of the CNT growth is sufficient to reduce the residence time during which the substrate is exposed to the elevated temperature T1.

FIG. 6B illustrates another flow chart depicting a method for synthesizing CNTs. At block 640, a growth chamber is provided and heated to a first temperature T1. The first temperature T1 can be in the range of about 450° C. to about 650° C. Temperature T1 may be sufficiently high to encourage the synthesis of CNTs on a substrate continuously fed into the chamber but not so high as to degrade either the substrate and any optional sizing material coated on the substrate. At block 650, a substrate is passed through the growth chamber. At block 660, a feed gas is pre-heated to a second temperature T2 before being introduced into the growth chamber. The second temperature T2 can be in the range of about 400° C. to about 1000° C. The feed gas may be heated using any of the methods or devices described herein. For example, the feed gas may be heated by mixing the feed gas with a process gas heated to a temperature above T2 such that the mixture is at a temperature T2 upon entering the growth chamber. This temperature may be sufficient to obtain a desired temperature profile within the growth chamber. At block 680, the pre-heated feed gas is introduced into the growth chamber to achieve a desired temperature profile within the growth chamber. CNTs can then form on the substrate to produce a CNT infused substrate. At the temperature T2, the pre-heated gas does not have sufficient thermal energy to raise the bulk material temperature of the substrate by any significant degree. Thus, the temperature of the substrate and any optional sizing can be maintained below its degradation temperature as the substrate fiber moves through the growth chamber.

An exemplary embodiment of the system will now be described with reference to FIG. 3 and FIG. 4. Growth cavity 425 has a rectangular cross-section and a volume of about 0.27 cubic feet. Cavity 425 receives a substrate fiber tow coated with an iron oxide catalyst obtained by passing the fiber tow at about 1 ft/min linespeed through a solution having 1 part (by volume) iron oxide nano-particles with a size of about 8 nm in 200 parts hexane (by volume). The fiber tow passes through growth cavity at a line speed of about 4 feet/minute. Growth cavity 425 is maintained at about 550° C. A process gas and feed gas mixture of about 0.15 to 0.2 liters of acetylene and about 15 to 20 liters of nitrogen is pre-heated to a temperature of about 650° C. The pre-heated gas is introduced into growth cavity 425 at a rate of about 15.15 liters per minute to about 20.2 liters per minute. The fiber tow continuously output from growth cavity 425 exhibits CNTs in the range of about 1.0% to about 2% (load weight percentage). A CNT infused substrate exits growth chamber 110 at the outlet of cavity 425. The CNT-infused substrates can have CNTs that are substantially uniform in length. In the process described herein, the residence time of the substrate in CNT growth chamber 110 can be modulated to control CNT growth and ultimately, CNT length. This provides a means to control specific properties of the CNTs grown. CNT length can also be controlled through modulation of the feed gas and process gas flow rates and reaction temperature. Additional control of the CNT properties can be obtained by controlling, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth methods and systems described herein can provide a CNT-infused substrate with uniformly distributed CNTs on the substrate. In some embodiments, the maximum distribution density, expressed as percent coverage, that is, the surface area of fiber covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically for a given set of parameters, a percent coverage within about 10% can be achieved across a fiber surface. Higher density and shorter CNTs are useful for improving mechanical properties, while longer CNTs with lower density are useful for improving thermal and electrical properties, although increased density is still favorable. A lower density can result when longer CNTs are grown. This can be the result of the higher temperatures and more rapid growth causing lower catalyst particle yields.

The CNT-infused substrates can include a substrate such as a carbon filament, a carbon fiber yarn, a carbon fiber tow, a carbon tape, a carbon fiber-braid, a woven carbon fabric, a non-woven carbon fiber mat, a carbon fiber ply, and other 3D woven structures. Filaments include high aspect ratio fibers having diameters ranging in size from between about 1 micron to about 100 microns. Fiber tows are generally compactly associated bundles of filaments and are usually twisted together to give yarns.

Processes of the invention for CNT infusion to substrates allow control of the CNT lengths with uniformity and in a continuous process allowing spoolable substrates to be functionalized with CNTs at high rates. With material residence times in growth chamber 110 between 5 to 300 seconds, linespeeds in a continuous process for a system that is 3 feet long can be in a range anywhere from about 0.5 ft/min to about 36 ft/min and greater. In some embodiments, a material residence time of about 5 to about 30 seconds can produce CNTs having a length between about 1 micron to about 10 microns. In some embodiments, a material residence time of about 30 to about 180 seconds can produce CNTs having a length between about 10 microns to about 100 microns. In still further embodiments, a material residence time of about 180 to about 300 seconds can produce CNTs having a length between about 100 microns to about 500 microns. One skilled in the art will recognize that these ranges are approximate and that CNT length can also be modulated by reaction temperatures, and carrier and feedstock gas concentrations and flow rates.

In some embodiments, the CNT infused substrate can be used to form a composite material. Such composite materials can comprise a matrix material to form a composite with the CNT-infused substrate. Matrix materials useful in the present invention can include, but are not limited to, resins (polymers), both thermosetting and thermoplastic, metals, ceramics, and cements. Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester. Metals useful as matrix materials include alloys of aluminum such as aluminum 6061, 2024, and 713 aluminum braze. Ceramics useful as matrix materials include carbon ceramics, such as lithium aluminosilicate, oxides such as alumina and mullite, nitrides such as silicon nitride, and carbides such as silicon carbide. Cements useful as matrix materials include carbide-base cermets (tungsten carbide, chromium carbide, and titanium carbide), refractory cements (tungsten-thoria and barium-carbonate-nickel), chromium-alumina, nickel-magnesia iron-zirconium carbide. Any of the above-described matrix materials can be used alone or in combination.

EXAMPLE

This prophetic example shows how aramid fiber material can be infused with CNTs at a low temperature in a continuous process using gas preheat to target improvements in mechanical properties, especially interfacial characteristics such as shear strength.

In this example, loading of shorter CNTs on fibers is targeted, where Kevlar fiber tow with a tex value of 800 (available from Du Pont of Wilmington, Del.) is implemented as the fiber substrate. The individual filaments in this aramid fiber tow have a diameter of approximately 17 µm.

Figure 13:
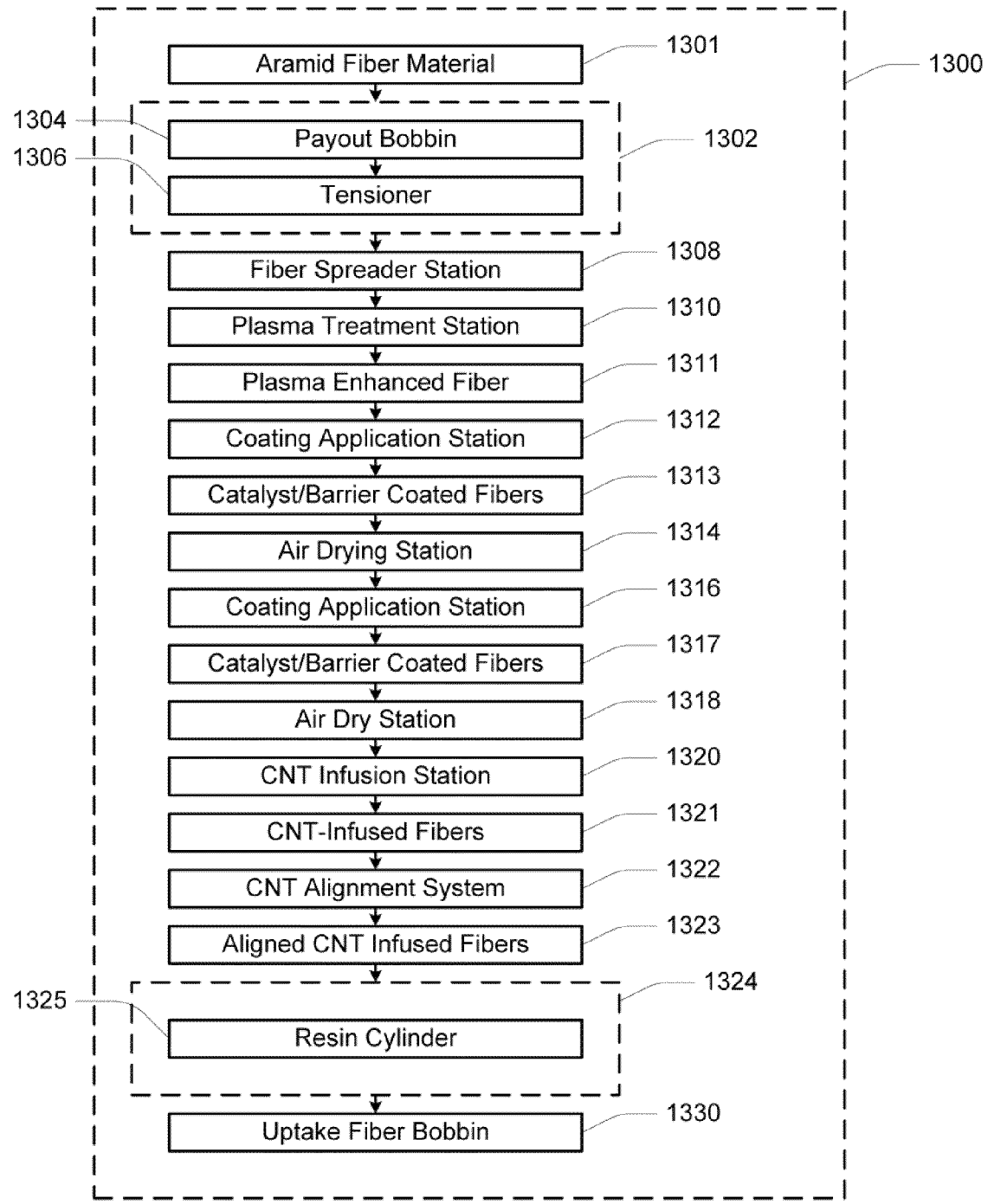
FIG. 13 illustrates a flow chart of a system for producing a CNT infused fiber according to an embodiment of the present invention.

FIG. 13 depicts a flow chart of a system 1300 for producing CNT-infused fiber in accordance with the illustrative embodiment of the present invention. System 1300 includes an aramid fiber material payout and tensioner station 1302, fiber spreader station 1308, plasma treatment station 1310, coating application station 1312, air dry station 1314, a second coating application station 1316, a second air dry station 1318, CNT-infusion station 1320, CNT alignment system 1322, resin bath 1324, and rotating mandrel 1330, interrelated as shown.

Payout and tension station 1302 includes payout bobbin 1304 and tensioner 1306. The payout bobbin delivers aramid fiber material 1301 to the process; the fiber is tensioned via tensioner 1306. For this example, the aramid fiber is processed at a linespeed of about 5 ft/min.

Fiber material 1301 is delivered to fiber spreader station 1308. As this fiber is manufactured without sizing, a sizing removal process is not incorporated as part of fiber spreader station 1308.

Fiber material 1301 is delivered to plasma treatment station 1310. For this example, atmospheric plasma treatment is utilized in a 'downstream' manner from a distance of 12 mm from the spread aramid fiber material. The gaseous feedstock is comprised of oxygen in the amount of 1.1% of the total inert gas flow (helium). Controlling the oxygen content on the surface of aramid fiber material is an effective way of enhancing the adherence of subsequent coatings, and is therefore desirable for enhancing mechanical properties of a aramid fiber composite.

Plasma enhanced fiber 1311 is delivered to coating application station 1312. In this example, an iron oxide based catalyst and a barrier coating material is combined into a single 'hybrid' solution and is employed in a dip coating configuration. The 'hybrid' solution is 1-part-by-volume 'EFH-1' (an iron oxide-based catalyst solution available from Ferrotec Corporation of Bedford, N.H.), 5-parts 'Accuglass T-11 Spin-On Glass' (available from Honeywell International Inc., Morristown, N.J.), 24-parts hexane, 24-parts isopropyl alcohol, and 146-parts tetrahydrofuran. The benefit of employing such a 'hybrid' coating is that it marginalizes the effect of fiber degradation at high temperatures. Without being bound by theory, it is believed that degradation of the aramid fiber material is intensified by the sintering of catalyst NPs at high temperatures (the same temperatures vital to the growth of CNTs). By encapsulating each catalyst NP with its own barrier coating, it is possible to control this effect. Because an increase in the mechanical properties, and not the thermal/electrical properties, is being targeted, it is desirable to maintain the integrity of the aramid fiber base-material, therefore a 'hybrid' coating can be employed.

Catalyst-laden and barrier coated aramid fiber material 1313 is delivered to air dry station 1314 for partial curing of the barrier coating. The air dry station sends a stream of heated air across the entire aramid fiber spread. Temperatures employed can be in the range of about 100° C. to about 350° C.

After air drying, the catalyst and barrier coating-laden aramid fiber 1313 is delivered to coating application station 1316, which is the same as coating application station 1312. The same 'hybrid' solution is used (1-part-by-volume 'EFH-1', 5-parts 'Accuglass T-11 Spin-On Glass', 24-parts hexane, 24-parts isopropyl alcohol, and 146-parts tetrahydrofuran). For this example, a configuration which includes multiple coating application stations is utilized to optimized the coverage of the 'hybrid' coating on the plasma enhanced fiber 1311.

Catalyst and barrier coating-laden aramid fiber 1317 is delivered to air dry station 1318 for partial curing of the barrier coating, and is identical to air dry station 1314.

After air drying, catalyst and barrier coating-laden aramid fiber 1317 is finally advanced to CNT-infusion station 1320. In this example, a rectangular reactor with a 12 inch growth zone is used to employ CVD growth at atmospheric pressure. A gas preheating system similar to what is shown in FIG. 8 is used to preheat growth gases to a temperature of about 700° C. About 97.6% of the total gas flow is inert gas (Nitrogen) and the other 2.4% is the carbon feedstock (acetylene). The growth zone is held at about 550° C. For the rectangular reactor mentioned above, 550° C. is relatively low growth temperature, however with the gas preheat along with the thermal protection provided by the barrier coating, prevents the high temperature degradation of the aramid fiber, but allows for CNT growth.

CNT-infused fibers 1321 are then passed through the CNT alignment system 1322, where a series of dies are used to mechanically align the CNTs' axis in the direction of each roving. Tapered dies ending with a 0.125 inch diameter opening is used to aid in the alignment of the CNTs.

After passing through CNT alignment system 1322, aligned CNT-infused fibers 1323 are delivered to resin bath 1324. The resin bath contains resin for the production of a composite material comprising the CNT-infused fiber and the resin. This resin can include, but are not limited to, commercially-available resin matrices such as polyester (e.g., orthophthalic polyesters), improved polyester (e.g., isophthalic polyesters), epoxy, and vinyl ester.

Resin bath 1324 can be implemented in a variety of ways, two of which are described below. First, resin bath 1324 can be implemented as a doctor blade roller bath wherein a polished rotating cylinder (e.g., cylinder 1325) that is disposed in the bath picks up resin as it turns. The doctor bar (not depicted in FIG. 13) presses against the cylinder to obtain a precise resin film thickness on cylinder 1325 and pushes excess resin back into the bath. As the aramid fiber roving 1323 is pulled over the top of cylinder 1325, it contacts the resin film and wets out. Alternatively, resin bath 1324 is used as an immersion bath wherein aramid fiber roving 723 is submerged into the resin and then pulled through a set of wipers or rollers that remove excess resin.

After leaving resin bath 1324, resin-wetted, CNT-infused fibers 1323 are passed through various rings, eyelets and, typically, a multi-pin "comb" (not depicted) that is disposed behind a delivery head (not depicted). The comb keeps the aramid fibers 1323 separate until they are brought together in a single combined band on rotating mandrel 1330. The mandrel acts as a mold for a structure requiring composites material with improved mechanical strength.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other processes, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising the steps of:
providing a growth chamber, the growth chamber being heated to a first temperature sufficiently high to facilitate a growth of carbon nanotubes (CNTs);
passing a substrate through the growth chamber;
heating an inert gas to a temperature exceeding a second temperture; and
mixing a feed gas comprising a carbon with the heated inert gas to create a pre-heated mixture of the feed gas and the inert gas that has a temperature of at least the second temperature, wherein the second temperature is sufficient to dissociate at least some of the feed gas into free carbon radicals; and
introducing the pre-heated mixture of feed gas and inert gas into the growth chamber wherein the free carbon radicals initiate formation of CNTs on the substrate.

2. The method of claim 1 wherein the second temperature is higher than the first temperature.

3. The method of claim 1, further comprising controlling the first temperature in a range of from about 450° C. to about 650° C.

4. The method of claim 1, further comprising controlling the second temperature in a range of from about 550° C. to about 1000° C.

5. The method of claim 1 wherein the substrate is comprises at least one material selected from the group consisting of: a carbon fiber, a graphite fiber, a cellulosic fiber, a glass fiber, a metal fiber, a ceramic fiber, an aramid fiber, and any combination thereof.

6. The method of claim 1 wherein the substrate is coated with at least one material selected from the group consisting of: a catalyst, and a sizing.

7. The method of claim 1, further comprising diffusing the pre-heated mixture of feed gas and inert gas into the growth chamber.

8. The method of claim 1, wherein the second temperature is within about 40% of the first temperature.

9. The method of claim 1, wherein:
the substrate comprises a substrate of spoolable dimensions;
the growth chamber comprises an inlet and an outlet; and
the step of passing a substrate through the growth chamber comprises the substrate of spoolable dimensions entering inlet and exiting the outlet continuously.

10. The method of claim 9, wherein the growth chamber comprises an open-air, continuous-operation, flow-through reactor.

* * * * *